July 27, 1965  R. D. HALE  3,197,058
TRAY
Filed April 24, 1964
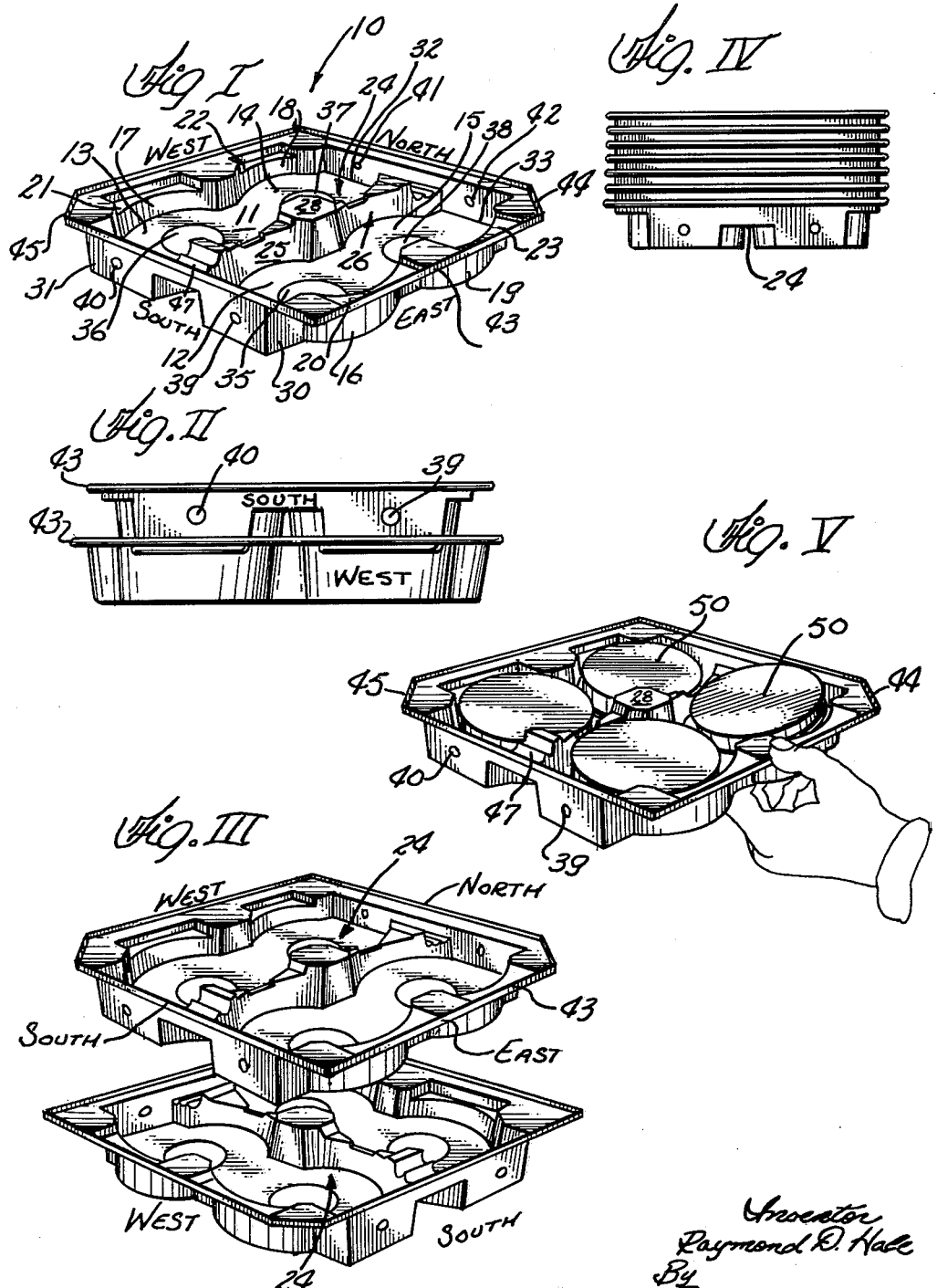

United States Patent Office 3,197,058
Patented July 27, 1965

3,197,058
TRAY
Raymond D. Hale, Basking Ridge, N.J., assignor to The Quaker Oats Company, Chicago, Ill., a corporation of New Jersey
Filed Apr. 24, 1964, Ser. No. 362,308
5 Claims. (Cl. 220—23.6)

The present invention relates to a tray which is adapted for preparing individual frozen confections such as ice cream sandwiches and similar products.

Freezer fresh soft ice cream is often served in the form of sandwiches by incorporating and freeze hardening the frozen confection between two baked cookies or wafers. In the case of individual restaurants, soda bars, snack shops and the like, it is common practice to prepare frozen sandwiches of this type by hand. In such cases, means which permit the simultaneous preparation and storage of a number of the frozen sandwich confections are desirable.

Accordingly, it is an object of the present invention to provide a tray unit which facilitates the preparation of frozen confections in sandwich form, such as ice cream sandwiches.

Another object of the invention is the provision of an inexpensive and easily manufactured tray unit of this type.

Yet another object of the invention is the provision of a tray unit of this type in which the frozen ice cream sandwich confections can be stored without squeezing or crunching until ready for use and then readily removed therefrom.

A still further object is the provision of a tray of such construction whereby a number of trays can be stored with the utilization of minimum space.

Further objects and advantages of the present invention will become apparent by reference to the following description and accompanying drawing wherein:

FIGURE I is a perspective view of a tray constructed in accordance with the present invention.

FIG II is a side view showing two trays in stacked relationship.

FIG. III is a perspective view showing the orientation of two trays prior to stacking thereof.

FIG. IV is a side view of a plurality of trays in nesting relationship.

FIG. V is a perspective view of a tray having ice cream sandwiches therein and showing the manner of removal of the sandwiches.

The drawing illustrates a generally square tray 10 formed of moldable material which includes a base 11 which takes the form of four spaced apart sandwich receiving compartments or pockets 12, 13, 14 and 15. The tray can be formed of any suitable moldable material including a plastic such as a copolymer or vinyl chloride and vinyl acetate or cellulose acetate, or non-plastic materials such as foil, paper and the like.

The molded structure is substantially square and extending upwardly from the base are four sloping sides which, for convenience, can be labeled north, south, east and west. The east and west sides each include two curved faces 16, 17, 18 and 19 which form the outside walls of the sandwich pockets near the edges of the tray. These curved faces do not extend the full vertical height of the tray but terminate in the recessed seat portions 20, 21, 22 and 23.

Pressed from the base is a channel-shaped partition 24 which divides the tray in a north-south direction and reinforces the structural rigidity of the tray. The partition 24 is provided with two curved portions 25 and 26, each of which has back to back curved faces which coact with the confronting curved faces on the east and west side walls of the tray to form the four spaced apart sandwich pockets 12, 13, 14 and 15. The center post 28, which is in the form of a generally truncated pyramid, serves as a common boundary therefor.

The sandwich pockets 12, 13, 14 and 15 do not comprise a perfect enclosed circle, but rather the tray is constructed with four offset portions contiguous to each of the pockets in the north and south directions. These offset portions 30, 31, 32 and 33 are of such size and configuration as to fit within the recessed seats 20, 21, 22 and 23 in the east and west walls of the tray. Hence when one tray is superimposed upon another, having first been turned one quarter revolution, the bottom wall of the offset portions 30, 31, 32 and 33 seat within the recessed seats in the east and west walls of the tray, which present a bearing surface of large area. In this manner a series of trays can be stacked in a sturdy superstructure, each tray providing a solid support for the tray of the next layer superimposed upon it. The clearance between the trays is adequate to accommodate the ice cream sandwiches or similar products within the sandwich pockets. Alternatively, when the trays are not in use they can be nested as shown in FIG. IV, this being accomplished by orienting the trays with the north-south partitions 24 being in parallel alignment. The inclination or slope of all the walls of the trays are such as to permit perfect mating of the trays with one tray fitting snugly within another so as to nest in a minimum space.

Four round apertures bearing the numerals 35, 36, 37 and 38 are provided in the base of the tray spaced so that each aperture is substantially in the center of each of the sandwich pockets 12, 13, 14 and 15. These apertures provide finger access whereby the sandwiches can be lifted from the pockets. Likewise, on the north and south side walls of the tray, four holes 39, 40, 41 and 42 are spaced so as to bisect each of the four sandwich pockets 12, 13, 14 and 15. These holes are adapted to receive sticks if it is desired to serve the frozen confections in this manner.

A generally square border flange 43 extends around the tray and is cut off or rounded at two diagonal corners as shown at 44 and 45. This a functional feature in that it provides a quick visual indication as to the orientation of a series of trays. When the cut off or round corners are aligned the trays are in nesting position and when the corners are not aligned the trays are in stacked position. The distal ends of the partition 24 flare out to provide a relatively wide rippled finger grip portion as indicated at 47.

In use of the trays, a baked sandwich cookie or wafer is inserted in each of the sandwich pockets 12, 13, 14 and 15 and the frozen confection placed thereon. A second sandwich cookie is then placed on top of the frozen confection. When the sandwiches are thus made, they can be stored in the trays without danger of crushing or crumbling thereof. To stack a series of trays, each superimposed tray is rotated through 90° relative to a contiguous tray so that the offset portions 30, 31, 32 and 33 seat in the recessed seats 20, 21, 22 and 23 which are provided in the east and west walls. The depth of the sandwich pockets are such as to readily accommodate the frozen confection sandwiches and levelling of the top sandwich cookies is automatically accomplished by stacking of the trays one upon another. The frozen confections, when ready for use, are removed from the pockets simply by inserting a finger through the holes beneath each ice cream sandwich and pushing up as shown in FIG. V, the numeral 50 indicating ice cream sandwiches.

It is believed that the many advantages of the present invention will be understood by those skilled in the art to which it appertains without further comment. It will be likewise apparent that the shape of the sandwich pockets can be varied as desired to accommodate a particular shape of cookie, such as a square cookie.

Those modifications and equivalents which fall within the spirit of the invention and the scope of the appended claims are to be considered part of the invention.

I claim:

1. A tray adapted for preparing and storing frozen confections of the ice cream sandwich type comprising a bottom wall, upwardly extending side walls, a border flange extending horizontally from the upper edge of said side walls, recessed seat portions in said border flange on the east and west sides of said tray, an upwardly projecting partition extending between opposite side walls and dividing said tray in a north-south direction, the east and west walls of said tray having at spaced intervals a plurality of shaped portions, said partition having a plurality of shaped portions which are so spaced to complement and form with the shaped portions in said east and west walls of the tray a plurality of compartments adapted to receive and maintain frozen confections, the bottom of said tray being formed with offset portions from said frozen confection compartments in north and south directions, the said offset portions being of a size and shape to be snugly received in said recessed portions in said border flange when identical trays are stacked in superposed relationship by orienting the superposed trays at 90° angles relative to each other, each of said frozen confection compartments being formed with an aperture in the bottom wall thereof to facilitate removal of frozen confections from the compartment.

2. A tray adapted for preparing and storing frozen confections of the ice cream sandwich type comprising a bottom wall, upwardly extending side walls, a border flange extending horizontally from the upper edge of said side walls, recessed seat portions in said border flange on the east and west sides of said tray, an upwardly projecting partition extending between opposite side walls and dividing said tray in a north-south direction and having the distal ends thereof flared to form two finger grip portions, the east and west walls of said tray having at spaced intervals a plurality of shaped portions, said partition having a plurality of shaped portions which are so spaced to complement and form with the shaped portions in said east and west walls of the tray four compartments adapted to receive and maintain frozen confections, the bottom of said tray being formed with offset portions from said frozen confection compartments in north and south directions, the said offset portions being of a size and shape to be snugly received in said recessed portions in said border flange when identical trays are stacked in superposed relationship by orienting the superposed trays at 90° angles relative to each other, each of said frozen confection compartments being formed with an aperture in the bottom wall thereof to facilitate removal of frozen confections from the compartment.

3. A tray adapted for preparing and storing frozen confections of ice cream sandwich type of generally square form comprising a bottom wall, upwardly extending side walls, a border flange extending horizontally from the upper edge of said side walls and having two diagonal corners thereof of a shape different than the two remaining corners, recessed seat portions in said border flange on the east and west sides of said tray, an upwardly projecting partition extending between opposite side walls and dividing said tray in a north-south direction, the east and west walls of said tray having at spaced intervals a plurality of shaped portions, said partition having a plurality of shaped portions which are so spaced to complement and form with the shaped portions in said east and west walls of the tray a plurality of compartments adapted to receive and maintain frozen confections, the bottom of said tray being formed with offset portions from said frozen confection compartments in north and south directions, the said offset portions being of a size and shape to be snugly received in said recessed portions in said border flange when identical trays are stacked in superposed relationship by orienting the superposed trays at 90° angles relative to each other, each of said frozen confection compartments being formed with an aperture in the bottom wall thereof to facilitate removal of frozen confections from the compartment, said tray having apertures in the side walls thereof spaced so as to bisect the vertical axis of each of said frozen confection compartments.

4. A tray adapted for preparing and storing frozen confections of the ice cream sandwich type of generally square form comprising a bottom wall, upwardly extending side walls, a border flange extending horizontally from the upper edge of said side walls and having two diagonal corners thereof of a shape different than the two remaining corners, recessed seat portions in said border flange on the east and west sides of said tray, an upwardly projecting partition extending between opposite side walls and dividing said tray in a north-south direction, the east and west walls of said tray having at spaced intervals a plurality of shaped portions, said partition having a plurality of shaped portions which are so spaced to complement and form with the shaped portions in said east and west walls of the tray four compartments adapted to receive and maintain frozen confections, the bottom of said tray being formed with offset portions from said frozen confection compartments in north and south directions, the said offset portions being of a size and shape to be snugly received in said recessed portions in said border flange when identical trays are stacked in superposed relationship by orienting the superposed trays at 90° angles relative to each other, each of said frozen confection compartments being formed with an aperture in the bottom wall thereof to facilitate removal of frozen confections from the compartment, said tray having apertures in the side walls thereof spaced so as to bisect the vertical axis of each of said frozen confection compartments.

5. A tray according to claim 4 molded of plastic material.

References Cited by the Examiner

UNITED STATES PATENTS

| 2,533,577 | 12/50 | Godfrey. | |
|---|---|---|---|
| 2,758,750 | 8/56 | Stroop | 220—97 |
| 2,851,188 | 9/58 | Pavelle | 220—23.6 |
| 2,889,072 | 6/59 | Lapham | 220—97 |

FOREIGN PATENTS 651,877  4/51  Great Britain.

THERON E. CONDON, *Primary Examiner.*

GEORGE O. RALSTON, *Examiner.*